Dec. 28, 1965    M. BALLESTRA    3,225,936
APPARATUS FOR CONTINUOUSLY SEPARATING LIQUIDS
HAVING DIFFERENT SPECIFIC GRAVITIES
Filed April 15, 1963

United States Patent Office 3,225,936
Patented Dec. 28, 1965

3,225,936
APPARATUS FOR CONTINUOUSLY SEPARATING LIQUIDS HAVING DIFFERENT SPECIFIC GRAVITIES
Mario Ballestra, Via XX Settembre 36/15, Genoa, Italy
Filed Apr. 15, 1963, Ser. No. 272,930
Claims priority, application Italy, Oct. 11, 1958, Patent 596,280
2 Claims. (Cl. 210—519)

This application is a continuation-in-part of my copending application, Serial No. 844,807 filed October 6, 1959 and now abandoned.

Intermittently or non-continuously operating devices for separating the two non-soluble constituents of a mixture from each other, are already known. In most cases these devices make use of centrifugal forces and generally the devices do not operate continuously, that is to say with continuous supply of the mixture and continuous discharge of the two constituents of the mixture from the devices.

The present invention relates to a continuously operating apparatus which separates: the two constituents of the mixture by gravity.

In accordance with the present invention, the apparatus is particularly suitable when both constituents of the mixture have a high degree of viscosity and it is necessary to avoid the risk that within the material counterflow movements may occur among the particles of the lighter substance which tend to stratify at the top and those of the heavier substance which tend to be displaced downwards.

The friction which arises between the particles displaced in counterflow is so great that in an ordinary discontinuous separator having a height of about one meter, at least twelve hours are needed for obtaining a satisfactory separation for instance in the case of a mixture of a sulphonic acid and sulphuric acid, which mixture is produced during the sulphonation of synthetic detergents; nevertheless a certain degree of enrichment is obtained in the upper part of the lighter and more viscous substance, whereas it is practically impossible for the last particles of the heavier substance, that is to say the sulphuric acid in the example quoted, to pass through the compact layer of sulphonic acid which surrounds and retains the sulphuric acid; therefore, the separation is never completely perfect.

According to a further feature of the invention, means are provided whereby the ratio between the pressure on the free surface of the lighter liquid and on the interface between the heavier liquid and the lighter liquid is kept constant during the operation of the separating apparatus.

The invention further consists in apparatus for separating liquids which have different specific gravities and are insoluble in one another characterized in that a system for distributing the mixture to be separated is provided at the level of the plane of separation of the two liquids already separated.

According to a further feature of the invention, this apparatus is provided with means for ensuring that the plane of separation of the two liquids already separated, corresponds exactly to the level at which the mixture leaves the distributing system.

According to a further feature of the invention, a horizontal distributor is disposed at the level of the plane of separation of the two liquids having different specific gravities and comprises two thin metal sheets of which the edges are of any suitable shape and are flush with and converge towards one another, and the mixture flows slowly out through the gaps formed by metal sheets, and the two mixed liquids separate spontaneously by reason of their different specific gravities.

According to a further feature of the invention, a device for rendering the distribution uniform, hereinafter referred to as a distribution uniformiser, co-operates with the distributor of the mixture of the two liquids to be separated, and the uniformiser may be for instance a collecting pipe shaped to correspond to the shape of the distributor having a straight shape, and the collecting pipe is hollow and communicates with one or more ducts through which the mixture to be separated is supplied.

According to a further feature of the invention, the uniformiser also performs its function by reason of the shape, arrangement and dimension of the ducts through which the mixture is supplied from uniformiser to the distributor.

An embodiment of the separating apparatus which is particularly suitable for viscous liquids which also enter at a temperature different from that of the material present in the apparatus and which contain small bubbles of air or gas, for instance foamy liquids and the like, is provided according to the invention, with a body of preferably rectangular shape which constitutes the outer jacket of the separator, and two discharge devices of the hollow collector type are provided outside this body and in the upper part of the separator, and the first of these devices is protected by a deflector retaining and deflecting any scum or foam that may be present, and is used for discharging the lighter liquid which falls into the interior of the collector by overflowing, and the second device is used for discharging the scum or foam floating on the liquid having the lower specific gravity, the scum or foam being driven towards the deflector and the second collector by a jet of air or gas, and an outlet pipe very similar to the one described above is arranged in the lower part which also is preferably formed with a dihedral bottom.

An embodiment of the apparatus, chosen purely by way of example, is diagrammatically illustrated in the accompanying drawings, in which.

Figure 1:
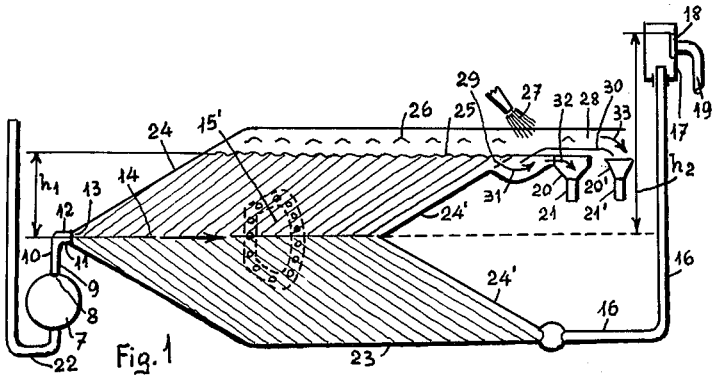
FIGURE 1 is a vertical section through the apparatus, which is of generally rectangular shape when seen from above and there are thus seen in vertical cross-section elements which extend longitudinally in a direction perpendicular to the plane of the drawing.
Figure 2:
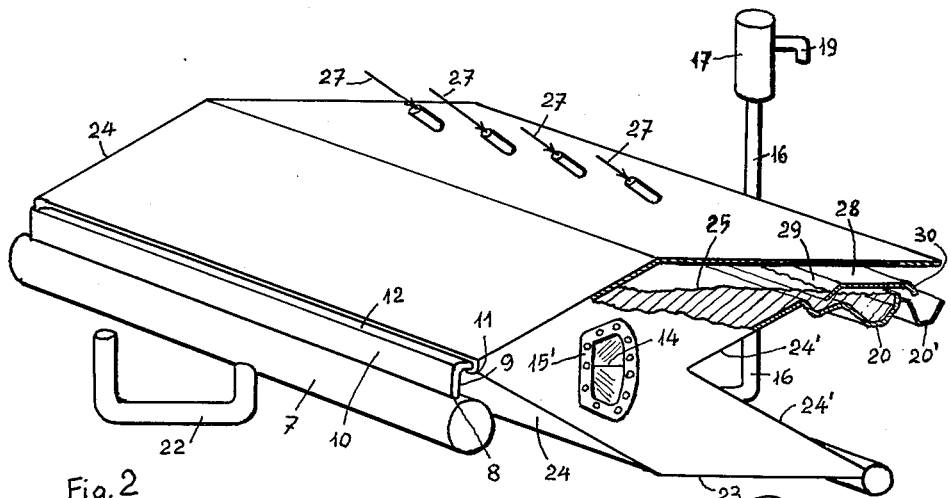
FIGURES 2 and 3 are perspective views, taken from different sides and partially in section, of the apparatus shown in FIGURE 1.
Figure 3:
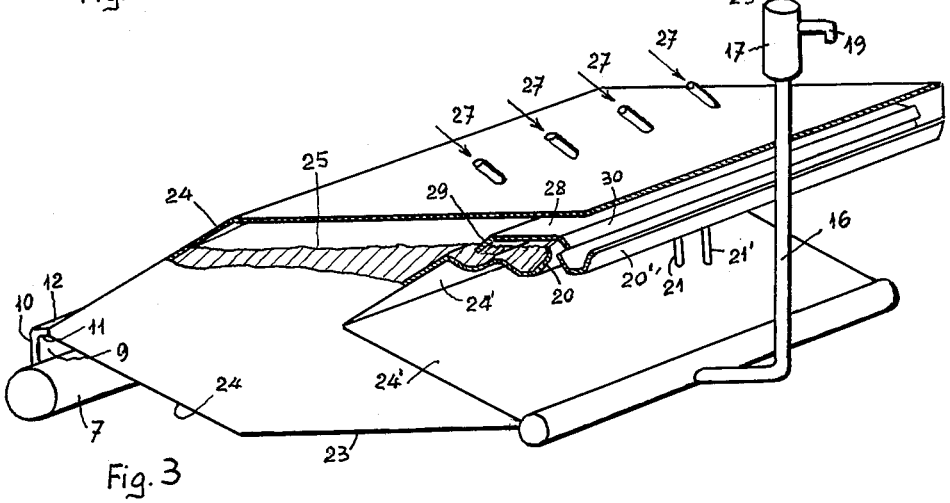

If one or both constituents have a high degree of viscosity, or if the liquid to be separated reaches the apparatus at a temperature different from that of the liquids which are in the apparatus, or if the liquid to be separated contains small bubbles of air or gas, the apparatus illustrated in FIGURE 1 is particularly suitable.

With reference to FIGURE 1, 22 is the pipe through which the mixture to be separated is supplied, and 7 is the device for continuously making the distribution uniform, or uniformiser; this uniformiser comprises a collecting pipe of cylindrical shape, apertured at the top at 8. 9 and 10 are rectangular sheet-metal plates at a very small distance from one another and welded to the edges of the straight aperture 8 in the collecting pipe 7. 13 is a straight gap through which the mixture to be separated is fed in. 14 is the plane of separation of the two liquids. 15' is one of two apertures provided in the vertical end walls of the jacket and closed by means of a glass pane; this pane is provided with a masking device having a plurality of holes, arranged at different heights; to facilitate checking the position of the plane of separation of the two liquids. 16 is a pipe connected to the rectangular bottom 23 of the apparatus. 17 is a small container for collecting liquid from the pipe 16; this container is vertically movable along the vertical end section of the pipe 16. 18 is an overflow descent wall, over which liquid falls into a discharge pipe 19 after having passed through the pipe 16 and being collected in the container 17. 23 is the rectangular bottom of the outer jacket; when viewed in vertical section, the jacket is in the form of a double rhomboid. 24 are the inlet sides of the jackets, inclined so as to form a diffuser, and 24' are the opposite outlet sides inclined so as to form a separator; 25 is the free surface of the liquid having the lower specific gravity, and also constitutes the plane of separation between the lighter liquid and the foam or scum 26 which is on top of the liquid; 20 and 20' are substantially funnel-shaped containers with inclined walls. The liquid that rises in the apparatus overflows and falls into the container 20. The foam or scum, carried by the moving liquid and driven by a jet of air 27, falls into the container 20' and 21' which are connected to discharge pipes. 28 is a deflector by which the scum or foam 26 is deflected and retained at 29 and at 30 is guided into the container 20'. The arrows 31 and 32 indicate the outlet path of the liquid having the lower specific gravity and the arrow 33 indicates the outlet path of the foam or scum.

In the apparatus there are two different walls, of which the first acts as a diffuser while the second acts as a separator of the mixture; moreover, in the apparatus the surface of separation is large, and the inspection windows are a distance from the entry of the mixture; in the apparatus, however, it is possible to separate even very viscous liquid.

Although for descriptive reasons the invention has been explained with reference to a specific embodiment given above, various modifications and changes can be made in carrying the invention into effect; for instance, by means known per se and arranged in any suitable manner the mixture may be subjected to ultrasonic vibrations, or the material to be separated may be subjected to magnetostrictive action or other action, for the purpose of facilitating the commencement of separation of the two liquids, or the construction and operation of the separation apparatus may be improved by the use of any suitable means which may be found suitable for making the operation of the apparatus simpler and more practical provided that the modifications and changes are based on the fundamental ideas of the invention as set forth in the appended claims.

What I claim is:

1. An apparatus for continuously separating two liquids with different specific gravities and insoluble in each other, comprising: a container adapted to contain a layer of a heavier liquid and a superposed layer of a lighter liquid, said container being of substantially rectilinear configuration when viewed in plan and having a vertical cross section constituted by two superposed rhomboids having one side in common and being symmetrically arranged with respect to said side in common; said vertical section being obtained by providing the container with a horizontal flat bottom and two longitudinal V-shaped walls, each of said longitudinal V-shaped walls being formed by two flat surfaces, namely an upper surface and a lower surface, disposed in a V-shape and connected to each other along a horizontal connection edge, the first of said V-shaped walls having its concavity towards the inside of the container and the second of said V-shaped walls having its concavity towards the outside of the container; said container including means defining at least one narrow horizontal rectilinear slot for the inlet of a mixture of said lighter liquid and said heavier liquid into said container substantially in the form of a rectilinear planar film, said slot being disposed exactly in correspondence with the horizontal connection edge of the two flat surfaces disposed in a V-shape forming the V-shaped wall which has its concavity towards the inside of the container; means for withdrawing said lighter liquid from the uppermost portion of the V-shaped wall which has its concavity towards the outside of the containers; means for withdrawing said heavier liquid from the lowermost portion of said V-shaped wall which has its concavity towards the outside of the container; and means for maintaining a constant ratio between the pressure on the free surface of the lighter liquid and on the interface between said two layers of liquids having different specific gravities, so that the plane of said interface passes through both of said connection edges.

2. An apparatus as defined in claim 1, wherein said means for withdrawing said lighter liquid comprises two discharge devices which are substantially funnel-shaped with inclined walls disposed outside said continer, the first of said discharge devices having a deflector at least partially overlying it for retaining and deflecting any scum present in the lighter liquid withdrawn from the uppermost portion of said container, and the second of said devices being positioned so as to receive and discharge any scum floating on said lighter liquid and deflected by said deflector.

References Cited by the Examiner
UNITED STATES PATENTS 2,264,912   12/1941   Kupper _____ 210—525 X
2,728,457   12/1955   Clarke _____ 210—521 X

FOREIGN PATENTS 569,612   11/1957   Italy.

REUBEN FRIEDMAN, *Primary Examiner.*